(12) United States Patent
Roulston et al.

(10) Patent No.: US 11,085,170 B2
(45) Date of Patent: Aug. 10, 2021

(54) METHOD OF OPERATING A MACHINE COMPRISING AN IMPLEMENT

(71) Applicant: RodRadar Ltd, Rinatya (IL)

(72) Inventors: John F. Roulston, Edinburgh (GB); Shai Segal, Ramat Gan (IL); Ronen Globinsky, Tel Aviv (IL); Simon Conway, Warwickshire (GB)

(73) Assignee: RodRadar Ltd., Rinatya (IL)

( * ) Notice: Subject to any disclaimer, the term of this patent is extended or adjusted under 35 U.S.C. 154(b) by 142 days.

(21) Appl. No.: 16/373,972

(22) Filed: Apr. 3, 2019

(65) Prior Publication Data
US 2019/0338490 A1 Nov. 7, 2019

(30) Foreign Application Priority Data

May 1, 2018 (GB) ..................................... 1807174

(51) Int. Cl.
*E02F 3/84* (2006.01)
*E02F 9/26* (2006.01)
(Continued)

(52) U.S. Cl.
CPC .............. *E02F 3/841* (2013.01); *E02F 3/844* (2013.01); *E02F 9/264* (2013.01); *G01B 5/24* (2013.01);
(Continued)

(58) Field of Classification Search
CPC . E02F 3/841; E02F 3/844; E02F 9/264; E02F 3/43; E02F 3/845; E02F 3/964;
(Continued)

(56) References Cited

U.S. PATENT DOCUMENTS

| 8,244,438 B2 * | 8/2012 | Koch ...................... E02F 3/433 |
|---|---|---|
| | | 701/50 |
| 8,571,762 B2 | 10/2013 | Mcaree et al. |
| | | (Continued) |

FOREIGN PATENT DOCUMENTS

| WO | WO 2011/107096 A1 | 9/2011 |
|---|---|---|
| WO | 2014089119 | 6/2014 |
| | (Continued) | |

OTHER PUBLICATIONS

United Kingdom Search Report for Application No. GB1807174.6; search completed on Oct. 24, 2018.

*Primary Examiner* — Jonathan M Dager
*Assistant Examiner* — Jean W Charleston
(74) *Attorney, Agent, or Firm* — Heidi Brun Associates Ltd.

(57) ABSTRACT

The present disclosure relates to a method of operating a machine comprising an implement and a machine for performing such a method. The implement is configured for motion in at least three degrees of freedom. In response to an input, movement of the implement from first to second positions is constrained to a first motion in a first plane or a second motion in a second plane. Sensor data received from an IMU attached to the implement is indicative of the movement of the implement. A first or second estimation mode is selected based upon a determination that the movement is the first or second motion. The first or second estimation mode is implemented to estimate the trajectory of the implement and the second position based upon the sensor data.

15 Claims, 4 Drawing Sheets

(51) Int. Cl.
*G01B 5/24* (2006.01)
*G01P 15/18* (2013.01)
*G05D 1/08* (2006.01)
*G01C 19/00* (2013.01)

(52) U.S. Cl.
CPC ............ *G01P 15/18* (2013.01); *G05D 1/0891* (2013.01); *G01C 19/00* (2013.01)

(58) Field of Classification Search
CPC .. E02F 9/265; E02F 3/435; G01B 5/24; G01P 15/18; G05D 1/0891; G01C 19/00; G01C 21/16; G01C 21/18
USPC ........................................................ 701/34.4
See application file for complete search history.

(56) References Cited

U.S. PATENT DOCUMENTS

| | | | | |
|---|---|---|---|---|
| 9,222,237 | B1* | 12/2015 | Green | E02F 9/265 |
| 9,347,205 | B2 | 5/2016 | Kosarev et al. | |
| 9,598,845 | B2* | 3/2017 | Baba | E02F 3/437 |
| 9,834,905 | B2* | 12/2017 | Matsuyama | E02F 9/2285 |
| 2005/0080559 | A1* | 4/2005 | Ishibashi | G01S 19/23 |
| | | | | 701/50 |
| 2009/0069987 | A1 | 3/2009 | Omelchenko et al. | |
| 2012/0232763 | A1* | 9/2012 | Mizuochi | B66C 23/905 |
| | | | | 701/50 |
| 2014/0107897 | A1* | 4/2014 | Zhu | E02F 9/2025 |
| | | | | 701/50 |
| 2014/0166362 | A1* | 6/2014 | Farmer | E21B 7/022 |
| | | | | 175/24 |
| 2014/0207331 | A1* | 7/2014 | Kosarev | E02F 9/264 |
| | | | | 701/34.4 |
| 2014/0300732 | A1* | 10/2014 | Friend | G06T 7/73 |
| | | | | 348/135 |
| 2016/0109270 | A1 | 4/2016 | Zabegaev et al. | |
| 2016/0153167 | A1* | 6/2016 | Green | B62D 11/001 |
| | | | | 701/50 |
| 2017/0107700 | A1 | 4/2017 | Faivre et al. | |

FOREIGN PATENT DOCUMENTS

WO WO-2014089119 A1 * 6/2014 ........... G01C 22/006
WO WO 2016/164975 A1 10/2016

* cited by examiner

METHOD OF OPERATING A MACHINE COMPRISING AN IMPLEMENT

TECHNICAL FIELD

The present disclosure relates to a method of operating a machine comprising an implement and a machine for performing such a method.

BACKGROUND

Machines, particularly those in construction, mining, earth moving, goods handling, forestry, agriculture or other such industries, typically utilise an implement to perform work, a monitoring operation or the like. A variety of implements may be attached to an arm arrangement of a multi-purpose machine. The implement may be controlled by an operator and/or controlled automatically by a control system of the machine. The accurate position of the implement may be required, for example for providing feedback to an operator, for controlling monitoring by the implement and/or providing a feedback loop to the control system.

U.S. Pat. No. 9,347,205 B2 discloses an implement having an implement acceleration that is operably coupled to a vehicle body having a body acceleration. An attitude of the implement is estimated by receiving acceleration measurements from an accelerometer mounted on the vehicle body and an accelerometer mounted on the implement. A state vector estimate for a system state estimate is calculated based at least in part on the body acceleration measurement and the implement acceleration measurement. The state vector estimate includes a representation of the attitude of the implement relative to the vehicle body. In addition to the accelerometer measurements, angular velocity measurements can be received from a gyroscope mounted on the vehicle body and a gyroscope mounted on the implement. The state vector estimate is then calculated based at least in part on the body acceleration measurement, the implement acceleration measurement, the body angular velocity measurement, and the implement angular velocity measurement. However, such an arrangement requires accelerometers and gyroscope mounted on both the vehicle body and implement, thereby increasing cost and complexity.

SUMMARY

The present disclosure is directed towards a method of operating a machine comprising an implement configured for motion in at least three degrees of freedom, the method comprising: receiving an input; in response to the input, moving the implement from first to second positions, the movement being constrained to either a first motion in a first plane or a second motion in a second plane; receiving sensor data from an IMU attached to the implement and indicative of the movement of the implement; determining whether the movement is the first or second motion; selecting a first or second estimation mode based upon the determination that the movement is the first or second motion respectively; and implementing the first or second estimation mode to estimate the trajectory of the implement and the second position based upon the sensor data.

Sequential samples of sensor data may be received from the IMU at the first and second positions. The implement may be static at the first and/or second positions. The implement may be moving at the first and/or second position. The method may comprise operating the machine in a normal operating mode in which the implement is operated in a motion in at least four degrees of freedom. The first and second estimation mode may estimate the second position relative to the first position based upon the estimated trajectory of the implement. A reference frame may be defined, the first position in the reference frame may be determined and the second position in the reference frame may be determined based upon the relative movement of the implement from the first to second positions. The method may further comprise determining that movement has occurred based upon a value derived from the sensor data reaching or exceeding a threshold value.

The method may further comprise performing a first monitoring operation at the first position to generate first monitored data; performing a second monitoring operation at the second position to generate second monitored data; and associating the first and second monitored data based upon the estimation of the second position. The sensor data may comprise acceleration data indicative of the acceleration of the implement and angular velocity data indicative of the angular velocity of the implement. The first and/or second estimation mode may comprise estimating the second position based upon the sensor data and a state transition model.

The method may further comprise maintaining the implement static at the first position and, the first and/or second estimation mode, in the presence of gravity disturbance in the sensor data, determining a gravity vector based upon acceleration data received from the IMU whilst the implement is static at the first position. The method may further comprise: determining a gravity vector based upon acceleration data received from the IMU whilst the implement is static at the first position; determining rotation data indicative of the rotation of the implement during the movement based upon angular velocity data received from the IMU; receiving acceleration data from the IMU indicative of the movement and gravity; and estimating the acceleration of the movement of the implement based upon the gravity vector, rotation data and acceleration data.

The first estimation mode may comprise determining the trajectory and second position based upon sensor data received from the IMU. The first estimation mode may comprise determining the trajectory and second position based upon a first estimation model and the sensor data. The first estimation mode may comprise receiving acceleration data indicative of the movement and determining the second position by resolving the direction of acceleration during the movement based upon angular velocity data received from the IMU. The first estimation mode may comprise implementing a Kalman filter. A state vector of the Kalman filter may comprise a position, velocity, acceleration, angular velocity and rotation quaternion. In the Kalman filter the motion of the implement may be constrained to the first plane. A measurements vector of the Kalman filter may comprise acceleration and angular velocity components based upon acceleration and angular velocity data received from the IMU. The first plane may be a vertical plane.

The second motion may be a circular motion in the second plane about a pivot axis and may be along a constant motion radius from the pivot axis. The pivot axis may be in the first plane. In the second estimation mode a motion radius may be received and the second position may be estimated based upon the received motion radius, a second estimation model and the sensor data received from the IMU. The motion radius may be estimated during a calibration mode. In the calibration mode the implement may be moved in a calibration motion and the motion radius may be estimated based upon the calibration motion. The calibration mode may comprise: moving the implement from a first calibration position to a second calibration position; determining a distance between the first and second calibration positions based upon acceleration and angular velocity data received from the IMU; determining an angle of rotation about the pivot axis between the first and second calibration positions based upon the angular velocity data received from the IMU; and estimating the motion radius based upon the distance and angle of rotation. The motion radius may be estimated based upon the second estimation model. The second estimation model may comprise implementing a Kalman filter. A state vector of the Kalman filter may comprise a position, velocity, rotation quaternion and motion radius. The second plane may be a horizontal plane.

The input may be received from at least one input device. The method may comprise operating a controller to perform the aforementioned method steps. The present disclosure further provides a machine comprising an implement and a control system, the control system comprising at least one input, an IMU attached to the implement and a controller. The controller may be configured to perform the aforementioned method. The implement may be attached to an arm arrangement for enabling the motion of the implement in the at least three degrees of freedom. The arm arrangement may be attached to a main body of the machine at the pivot axis. The machine may comprise at least one actuator for operating the arm arrangement to move the implement in the at least three degrees of freedom, first motion and/or second motion. The present disclosure may further provide a computer readable medium storing instructions for performing the aforementioned method.

The present disclosure further provides a machine comprising: an implement attached to a main unit by an arm arrangement; and a control system for controlling the arm arrangement to move the implement in at least three degrees of freedom, the control system comprising at least one input, an IMU attached to the implement, at least one actuator for controlling the movement of the arm arrangement and implement; wherein the control system further comprises a controller configured to: receive an input from the at least one input; in response to the input, move the implement from first to second positions, the movement being constrained to either a first motion in a first plane or a second motion in a second plane; receive sensor data from the IMU indicative of the movement of the implement; determine whether the movement is the first or second motion; select a first or second estimation mode based upon the determination that the movement is the first or second motion respectively; and implement the first or second estimation mode to estimate the trajectory of the implement and the second position based upon the sensor data.

DETAILED DESCRIPTION

In general, the present disclosure relates to a method of operating a machine comprising an implement, the implement including a motion sensor to detect and implement a movement of the implement. The present disclosure generally relates to determining, by estimation, the position of an implement of a machine and operating the machine based upon such a determination. An inertial measurement unit (IMU) provides an indication of a motion of the implement, which is constrained to either a first plane or a second plane. The position and trajectory of the implement is determined based upon the data output from the IMU. The determined position and/or trajectory may be used in a subsequent operation, such as work or a monitoring operation.

The Machine

Figure 1:
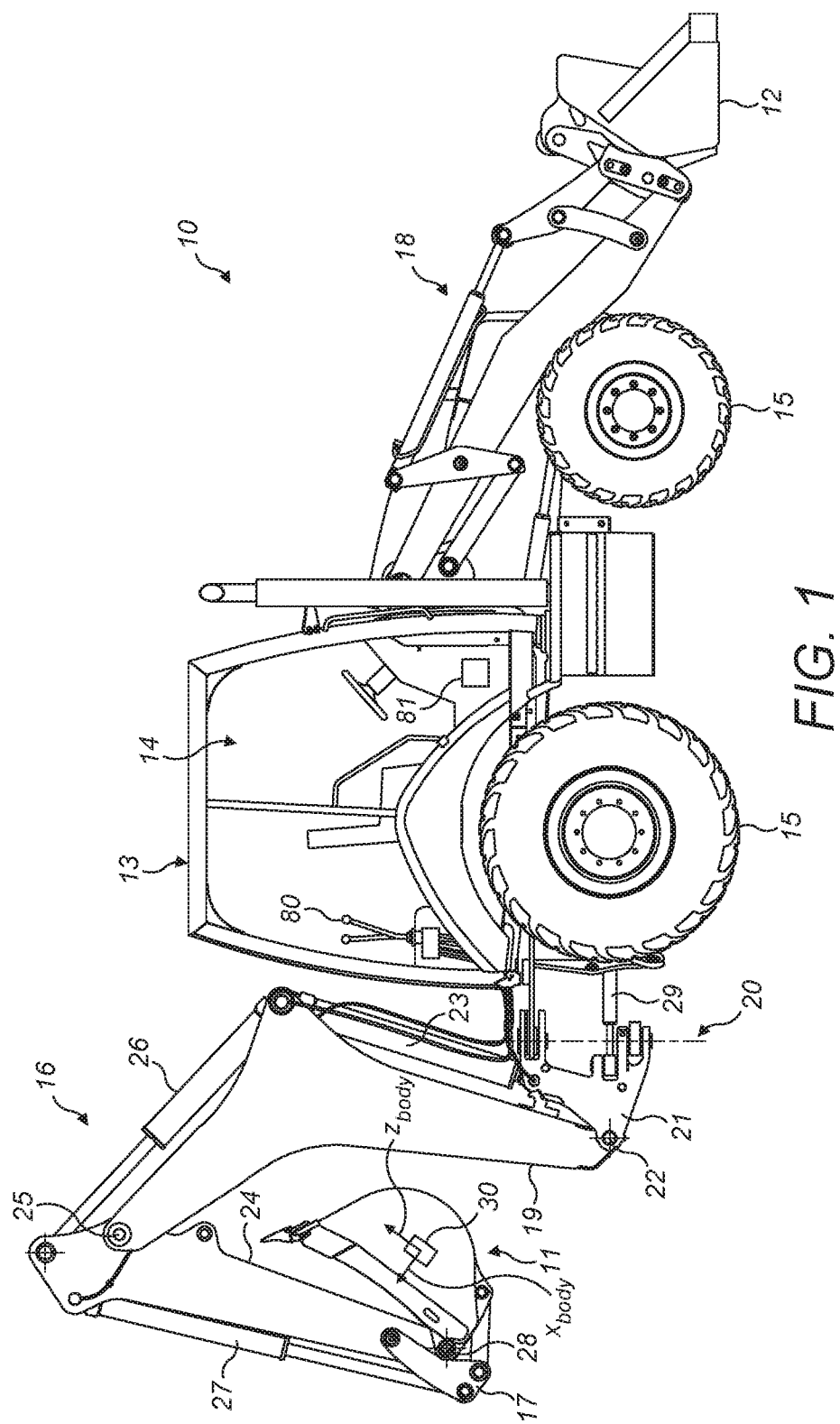
FIG. 1 illustrates a schematic side elevation of a machine according to the present disclosure.

FIG. 1 illustrates an embodiment of a machine 10, in this case a backhoe loader, comprising an implement 11. The machine 10 may be any suitable type of machine, including multi-purpose machines, such as excavators, backhoes, loaders, dozers, shovels, fellers, harvesters, material handlers and other such work machines. The machine 10 may comprise a main unit 13 having an operator cabin 14 for an operator and a power unit therein, such as an internal combustion engine, for providing power to ground engaging means 15, such as tracks or wheels. The machine 10 may comprise a first arm arrangement 16 to which the implement 11, in this case a bucket, may be connected via a coupling arrangement 17. The machine 10 may also comprise a further tool 12 attached to the main unit 13 via a second arm arrangement 18. The implement and/or further tool 11, 12 may be of any other suitable type, such as a fork, hammer, plow, handling arm, multi-processor, pulveriser, saw, shears, blower, grinder, tiller, compactor, trencher, winch, auger, blade, broom, cutter, planer, delimber, felling head, grapple, mulcher, ripper, rake or the like. The implement 11 may comprise a monitoring system, such as a ground penetrating radar, mounted thereon.

The arm arrangement 16 may comprise a first arm 19, which may be a boom, pivotally attached to the main unit 13 about an implement pivot axis 20. An intermediate connection 21 between the main unit 13 and first arm 19 may provide a pivotal attachment between the first arm 19 and the intermediate connection 21 about an intermediate pivot axis 22. The implement pivot axis 20 and the intermediate pivot axis 22 may be substantially orthogonal to one another. Unit pivot actuators 29 may be connected between the first arm 19 and the main unit 13 to pivot the first arm 19 about the implement pivot axis 20. In a preferred embodiment as shown, a pair of unit pivot actuators 29 are used to tilt the intermediate connection 21 about the implement pivot axis 20. A first end of each unit pivot actuator 29 may be connected to the main unit 13 and a second end of each unit pivot actuator 29 may be connected offset from the implement pivot axis 20 (and from the bottom hinge portion formed between the intermediate connection 21 and implement pivot axis 20) such that the intermediate connection 21 can swivel about the unit pivot actuator 29 and implement pivot axis 20. A first hydraulic actuator 23 may be connected between the first arm 19 and the intermediate connection 21 to pivot the first arm 19 about the intermediate pivot axis 22. The arm arrangement 16 may comprise a second arm 24, which may be a stick, pivotally attached to the first arm 19 about a stick pivot axis 25. A second hydraulic actuator 26 may be connected between the first and second arms 19, 24 to pivot the second arm 24 relative to the first arm 19 about the stick pivot axis 25. A third hydraulic actuator 27 may be connected between the second arm 24 and the coupling arrangement 17 to pivot the implement 11 relative to the second arm 24 about a coupling pivot axis 28. Furthermore, although not shown, the implement 11 may be connected to the coupling arrangement 17 such that it can rotate relative thereto. For example, the coupling arrangement 17 may comprise a tilt rotator or the like.

The machine 10 may comprise a machine control system, which may comprise a controller 81 communicatively connected (via a wired or wireless connection) to at least one input 80, at least one output, at least one sensor and at least one machine communication module. The controller 81 may be of any suitable known type and may comprise an engine control unit (ECU) or the like. The controller 81 may comprise a memory, which may store instructions or algorithms in the form of data, and a processing unit, which may be configured to perform operations based upon the instructions. The memory may comprise any suitable computer-accessible or non-transitory storage medium for storing computer program instructions, such as RAM, SDRAM, DDR SDRAM, RDRAM, SRAM, ROM, magnetic media, optical media and the like. The processing unit may comprise any suitable processor capable of executing memory-stored instructions, such as a microprocessor, uniprocessor, a multiprocessor and the like. The controller 81 may further comprise a graphics processing unit for rendering objects for viewing on an output such as a display.

The controller 81 receives data from at least one input 80, at least one sensor and/or the machine communication module and perform operations based upon the instructions, such as by sending data to an output, operating at least one sensor and/or the machine communication module, performing calculations or carrying out logic-based tasks. The controller 81 may be configured to operate the first and/or second arm arrangements 16, 18 to move the implement and/or further tool 11, 12.

Figure 2:
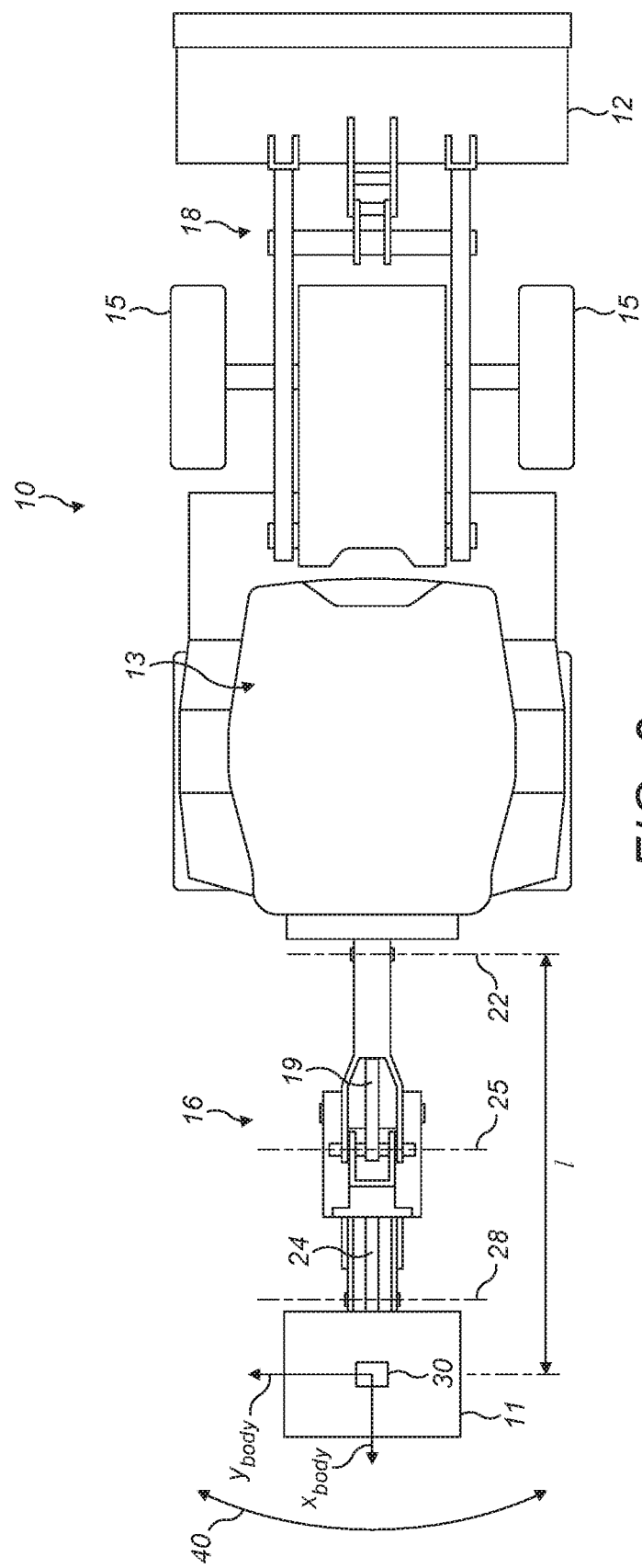
FIG. 2 illustrates a schematic top plan view of a machine according to the present disclosure.

Referring to FIG. 2, the at least one sensor comprises an inertial measurement unit (IMU) 30 mounted to the implement 11. The IMU 30 is configured to sense and generate sensor data indicative of movement of the implement 11, particularly its linear acceleration and angular velocity. The IMU 30 may be an at least six degree of freedom (i.e. three translational movements and three rotational movements) IMU, such that the sensor data comprises acceleration data indicative of the acceleration of the implement 11 in three dimensions and angular velocity data indicative of the angular velocity of the implement 11 in three dimensions. The IMU 30 typically comprises an accelerometer for generating the acceleration data and a gyroscope for generating the angular velocity data. The IMU 30 may be connected to the controller 81 and provide the sensor data to the controller 81. The acceleration and angular velocity data may be generated by the IMU 30 in a fixed measurement frame of reference having its origin at the IMU 30. The measurement frame is illustrated in FIGS. 1 and 2 as a body frame $(x_{body}, y_{body}, z_{body})$.

The machine 10 may further comprise a monitoring system (not shown) having at least one monitoring device located on the implement 11. The monitoring system may be connected to the machine control system and/or to a remote computing system, for example wirelessly over a network. Such a monitoring system may enable the machine 10 to implement a monitoring mode to perform one or more monitoring operations to generate monitored data from the at least one monitoring device. The implement 11 may move during a monitoring operation or between monitoring operations and the monitoring system may require knowledge of the position or movement of the implement 11 during such monitoring operations. The monitoring system may process at least the monitored data based upon the movement of the implement 11, for example for use in further control of the machine 10.

The monitoring system may comprise a radar system, preferably a ground penetrating radar system, for mapping the ground and detecting features underground. The radar system may comprise at least an antenna assembly located on the implement 11 for periodically scanning the ground in monitoring operations and generating monitored data. In order to scan a large area the implement 11 may be moved across the ground whilst performing multiple scans or monitoring operations, either under the control of the operator or automatically. By also knowing the positions and movement of the implement 11 during the scan the monitoring system may generate a 2D or 3D map indicative of the features underground.

Motion Constraints

In a normal operating mode the machine 10 is operable to translate the implement 11 in three degrees of freedom. For instance, in FIGS. 1 and 2 the implement 11 may translate along any one of $(x_{body}, y_{body}, z_{body})$. The first arm arrangement 16 may be controlled by the machine control system and enable the movement of the implement 11 in the three degrees of freedom relative to the main unit 13 (i.e. up, down, side to side and to and from the main unit 13). In the illustrated example the implement 11 is also capable of rotation in two degrees of freedom by rotating relative to the second arm 24 and relative to the implement pivot axis 20. However, in other embodiments the implement 11 may be capable of rotation in three degrees of freedom, such as by the coupling arrangement 17 comprising a tilt rotator. Alternatively, the implement 11 may be capable of rotation only in one degree of freedom, for example by hanging freely from the second arm 24 such that it cannot rotate relative to the main unit 13 other than around the implement pivot axis 20 by rotation of the arm arrangement 16. Therefore, in the normal operating mode the implement 11 can move in at least four degrees of freedom (i.e. three directions of translation and at least one rotational direction).

In the present disclosure the machine 10 may be operated in a constrained operating mode in which the motion of the implement 11 is constrained to less than the degrees of freedom in the normal operating mode. The constrained operating mode may be implemented, for example, during a monitoring mode, or during any implement operation mode requiring an accurate determination of the motion of the implement 11. In the constrained operating mode the implement 11 is moved from a first to a second position along a trajectory by the machine control system upon receiving an input. The input may be from a joystick 80 operated by an operator, from an interface in which the operator has entered desired coordinates of the second position, based upon an automatic control strategy determined by the monitoring system for providing a suitable monitoring path and the like.

In the present disclosure the implement 11 may be static at the first and/or second positions, which may therefore be the start and/or end positions of the trajectory of the implement 11. However, instead, the implement 11 may be moving along a trajectory at the first and second positions. The first and second positions may be the position of the implement 11 at sequential sampling points of the sensor data from the IMU 30 as the implement 11 moves from start to end positions. For example, the controller 81 may continuously estimate the trajectory of the implement 11 based upon samples of sensor data and the position of the implement 11 at a subsequent sampling point (i.e. the second position) relative to the position of the implement 11 at the previous sampling point (i.e. the first position). The controller 81 may repeat this estimation a plurality of times at each sampling point between the start and end positions of the implement 11. As a result, the continuous motion of the implement 11 can be tracked and the end position of the implement 11 estimated. The first and second positions may be positions at which a monitoring operation occurs, as discussed in further detail below.

In the constrained operating mode the motion of the implement 11 is constrained to either a first motion in a first plane or a second motion in a second plane. The implement 11 moves only in the first motion or the second motion. The first plane is preferably a vertical plane and the implement pivot axis 20 is in the first plane (i.e. the first plane is in ($x_{body}$, $z_{body}$) in FIG. 1). The second plane is preferably a horizontal plane and is perpendicular to the implement pivot axis 20 (i.e. the second plane is ($x_{body}$, $y_{body}$) in FIG. 2). The second motion is a circular motion 40 in the second plane about the implement pivot axis 20. A motion radius l is the distance from the implement pivot axis 20 to the IMU 30 and is constant in the second motion. It will be appreciated that the terms "horizontal plane" and "vertical plane" are not necessarily restricted to being perpendicular or along to the direction of gravity respectively. The machine 10 may be operating on a slope, such that a horizontal plane can be defined as being parallel to the surface of the slope and the vertical plane as being perpendicular to the horizontal plane. The horizontal plane may be defined as being at the same incline relative to the direction of gravity as the incline of the slope relative to the direction of gravity.

The constraint of the movement of the implement 11 to the first or second motion may be applied in a number of ways. The machine control system may be configured to implement such constraints in the constrained operating mode, either automatically or upon request from an operator via an input 80. For example, the operator may use at least one input 80, such as the joystick, to control motion of the implement 11 in only the first motion or the second motion. The machine control system may also translate the request from the operator at the at least one input 80 into a movement of the implement 11 only as the first or second motion. Alternatively, the movement of the implement 11 may be automatically controlled by the machine control system in only the first or second motion.

The location of the second position may be determined relative to the first position. In particular, a frame of reference may be defined or fixed and the trajectory and first and second position determined in this reference frame. For instance, as in FIGS. 1 and 2, a body frame may be defined as the measurement frame, and the origin of the reference frame may be set at the origin and orientation of the body frame in the first position. Therefore, effectively, the reference frame, body frame and measurement frame are the same at the first position. Alternatively, the origin of the reference frame may be fixed at a part of the machine 10 (such as the main unit 13) and the first position in the reference frame determined by measurement or calibration. The trajectory and second position relative to the first position in the reference frame may thus be determined based upon the sensor data indicative of the motion between the first and second positions. However, as the implement 11 rotates and/or translates between the first and second positions, the measurement frame also rotates and/or translates with the implement 11 relative to the reference frame. Therefore, the sensor data output may also be transformed into the reference frame to determine the trajectory and second position relative to the first position in the reference frame.

Controller Operation

Figure 3:
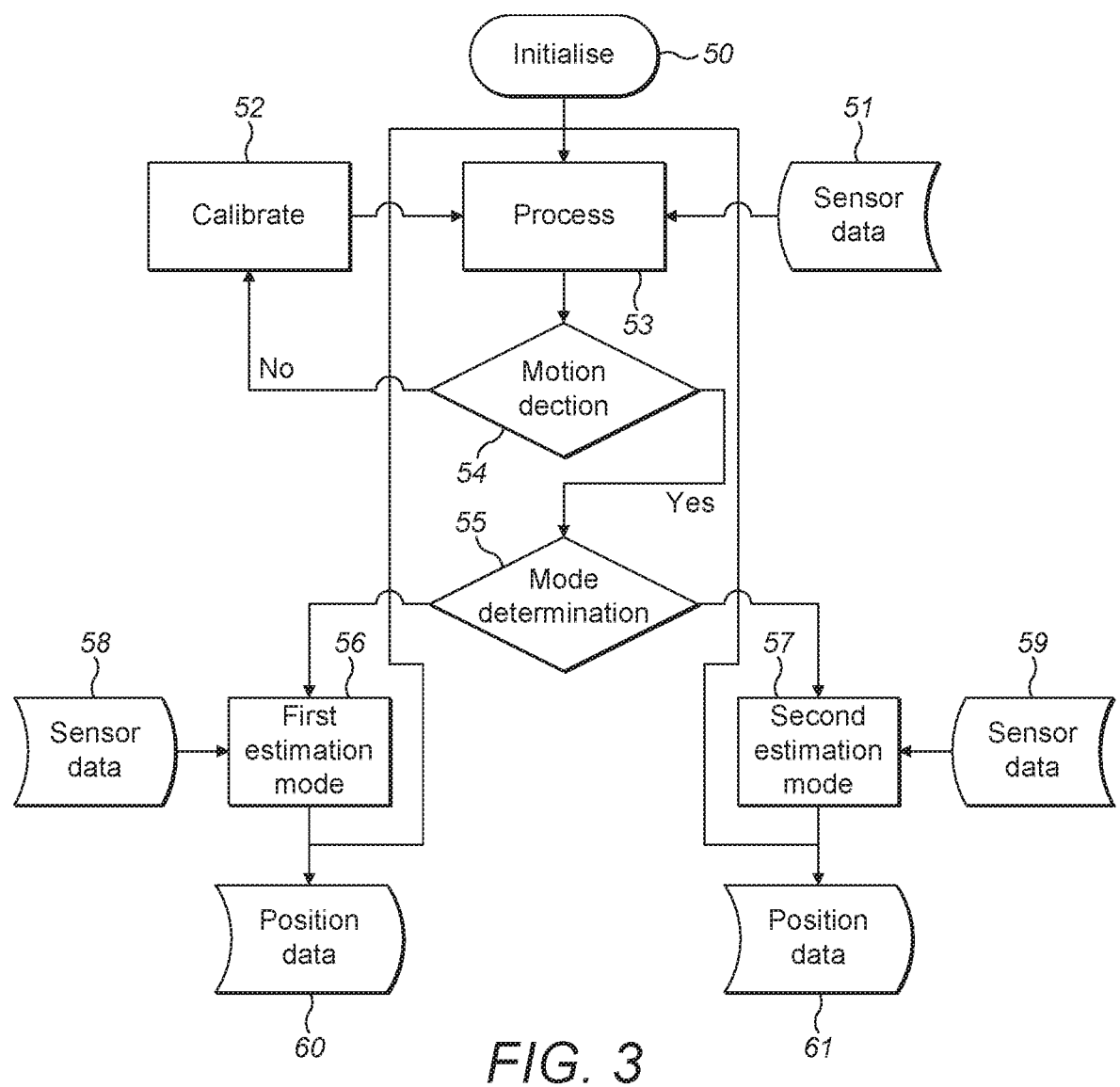
FIG. 3 illustrates a flowchart illustrating a method of operating a machine and/or controller according to the present disclosure.

A method of operating the machine 10 and/or machine control system according to the present disclosure is illustrated in FIG. 3, which particularly illustrates a method of determining or estimating the second position of the implement 11. The method may be stored as instructions on the controller memory.

In an initialise step 50 the controller 81 may load a program containing instructions from its memory and run the program. The sensor data 51 is supplied from the IMU 30 to the controller 81. The sensor data 51 may be expressed as a sensor output matrix u (the superscript T indicates the transpose of a matrix as per standard convention):

$$u=[A^T \omega^T]^T \qquad (1)$$

The three-axis acceleration vector measurement A and the three-axis angular velocity vector measurement ω in the measurement frame at time point t are expressed as:

$$A(t)=[A_x(t)A_y(t)A_z(t)]^T \qquad (2)$$

$$\omega(t)=[\omega_x(t)\omega_y(t)\omega_z(t)]^T \qquad (3)$$

Therefore, A(t) is the acceleration data from the accelerometer and ω(t) is the angular velocity data from the gyroscope, which by calibration are in the measurement frame.

In an initial data processing step 53 the controller 81 receives, assesses and calibrates the sensor data 51. During calibration the implement 11 is stationary in the first position and the controller 81 calibrates the sensor data based upon calibration instructions 52 stored on the controller 81. The calibration instructions 52 may comprise a low-pass filter and raw samples of sensor data may be firstly filtered using the low-pass filter to remove noise and the like from the sensor data. The calibration instructions 52 may also comprise, which may be after the application of the low-pass filter, estimating the mean values of the sensor data over periods of time.

Furthermore, during calibration, the components of gravitational acceleration in the accelerometer data may be determined, preferably after filtering and adjustment of the sensor data output 51 to mean values. In particular, the controller 81 determines a gravity vector in the measurement frame, $[a_{gravity}^x, a_{gravity}^y, a_{gravity}^z]^T$, as comprising the output of the accelerometer whilst the implement 11 is static at the first position. The acceleration in the body frame may be defined as follows:

$$A_b(t=0)D(t=0)_{B(t=0)}^I \cdot \begin{bmatrix} 0 \\ 0 \\ g \end{bmatrix} = \begin{bmatrix} a_{gravity}^x \\ a_{gravity}^y \\ a_{gravity}^z \end{bmatrix} \qquad (4)$$

g is gravitational acceleration. $D(t=0)_{B(t=0)}^I$ is a rotation matrix from the reference frame to the measurement frame (here also the body frame) in the first position (i.e. at t=0). The controller 81 calculates $D(t=0)_{B(t=0)}^I$ during the initial data processing step 53 so that, upon motion of the implement 11, a rotation matrix defined by the magnitudes of the components of gravitational acceleration in the measurement frame is known at the first position.

In a motion detection step 54, the controller 81 determines whether the implement 11 is moving based upon the sensor data. In particular, the controller 81 may determine that motion is occurring based upon a value derived from the sensor data reaching or exceeding a threshold value. For instance, one or more components of the sensor output matrix u may exceed a threshold value. The threshold value may be determined by experimentation and may be sufficiently high that it is not exceeded by values resulting from sensor noise and/or vibration of the machine 10 and/or implement 11. For example, the value may comprise the estimated energy of the acceleration vector measurement A and the threshold value is a threshold energy above which motion is determined to be occurring. A suitable method is disclosed in "*Motion Mode Recognition and Step Detection Algorithms for Mobile Phone Users*", Susi, Renaudin and Lachapelle, Sensors 2013, 13, 1539-1562; doi: 10.3390/s130201539. The threshold value may be the sum of squares of values of the sensor data, which may be squared by a specified factor.

If no motion is detected at motion detection step 54 the controller 81 may return to the initial data processing step 53, may continue to calibrate the sensor data based upon the calibration instructions 52 and sensor data output 51 and may implement the motion detection step 54 until motion is detected.

If motion is detected at motion detection step 54 the controller 81 may implement a mode determination step 55 in which it may determine whether the implement 11 is undergoing first or second motion. The determination may be based upon the sensor data. For example, the controller 81 may determine that a first motion is occurring if A and/or ω fall within a first range of values and may determine that a second motion is occurring if A and/or ω fall within a second range of values. The first and second ranges may be determined experimentally and stored on the controller 81. Alternatively, the controller 81 may determine that first or second motion is occurring based upon input data received from at least one input 80. The at least one input 80 may be a switch operated by an operator to indicate that they are operating the implement 11 in the first or second motion. Alternatively, the at least one input 80 may be that used by the operator to control motion of the implement 11, such as the joystick, and the controller 81 may determine whether the first or second motion is occurring based upon the operation of the at least one input 80 by the operator (e.g. by determining that the operator has instructed the machine 10 to move the implement 11 in a first or second motion).

If in the mode determination step 55 the controller 81 determines that the implement 11 is undergoing first or second motion it implements a first or second estimation mode 56, 57 respectively to estimate the trajectory and second position based upon the sensor data, preferably in the reference frame. In particular, the controller 81 may receive sensor data 58, 59 (which may be calibrated in accordance with the calibration instructions 52), process the sensor data 58, 59 and generate trajectory and position data 60, 61. The position data 60, 61 may be an estimation of the second position of the implement 11 in the reference frame. The trajectory data may represent the trajectory of the implement 11 through a plurality of positions in the reference frame.

The controller 81 applies first and second estimation models in the first and second estimation modes 56, 57 to determine the trajectory and second position based upon whether the implement 11 is undergoing a first or second motion. During the processing steps the controller 81 may implement at least one estimation model, preferably a state estimation algorithm, based upon estimation instructions stored on the controller 81. The at least one state estimation algorithm may be a Kalman filter, preferably an Extended Kalman Filter (EKF). A different estimation model or Kalman filter may be implemented for each of the first and second estimation modes 56, 57. Generally, in a Kalman filter state vectors including the trajectory and position of the implement 11 can be updated based upon prediction equations based on the model of the motion and update equations based upon measurements.

First Estimation Mode

In the first estimation mode 56, the trajectory and second position of the implement 11 may be determined based upon the sensor data. In particular, the controller 81 may receive sensor data from the IMU 30 and determine the trajectory and second position based upon a first estimation model and the sensor data.

Preferably in the first estimation model the reference frame is set as the body frame at the first position. The body frame is the measurements frame. The position of the reference frame relative to the main unit 13 can be determined by direct measurement or calibration.

In the first estimation model the controller 81 may account for gravity in the acceleration data received from the IMU 30 by determining a gravity vector and removing gravitational acceleration from the sensor data based upon the gravity vector. This may be based upon the gravitational acceleration in the body frame and rotation matrix determined in the initial data processing step 53 and equation (4). Thus the estimated acceleration of the motion of the implement 11 from the first position to the second position in the body frame at the first position may be determined by the controller 81 as:

$$\begin{bmatrix} a^x_{motion} \\ a^y_{motion} \\ a^z_{motion} \end{bmatrix} = A_b(t) - D(t)^{B(t=0)}_{B(t)} \cdot \begin{bmatrix} a^x_{gravity} \\ a^y_{gravity} \\ a^z_{gravity} \end{bmatrix} \quad (5)$$

$A_b(t)$ is the acceleration data generated by the IMU 30 as the implement moves from the first to second positions. $D(t)^{B(t=0)}_{B(t)}$ is a rotation matrix defining the rotation of body frames of the implement 11 between the first and second positions (i.e. the rotation between the reference frame at the first position and the body frame at the second position). This rotation matrix may be calculated by the controller 81 based upon the angular velocity data and the correlation between this data and the associated acceleration data received from the IMU 30 as the implement 11 moves from the first to second positions. Hence, the estimated acceleration can be translated into the reference frame.

In the first estimation model the second position of the implement 11 is estimated by integrating (twice) over the estimated acceleration of motion. The motion is also constrained only to the first plane and, as a result, the equation of motions of the first estimation model result in more accurate determinations of the second position.

In the first estimation mode 56 the second position is preferably estimated by implementing an Extended Kalman Filter (EKF) as part of the first estimation model. The following is a description of a particularly suitable EKF for the first estimation mode 56.

First Estimation Mode: Exemplary Estimation Model

In the EKF the motion of the implement 11 is determined in the reference frame. The controller 81 stores a state vector, which represents the states to be estimated by the EKF in the first estimation mode 56, in the reference frame comprising the position of the IMU 30 and its derivatives.

Thus the state vector comprises the position $P_{ref}$, velocity $V_{ref}$, acceleration $A_{ref}$ and angular velocity vectors $\omega_{ref}$ respectively of the implement 11. In particular, the state vector is:

$$x=[P_{ref}^T V_{ref}^T A_{ref}^T \omega_{ref}^T q^T]^T \in R^{16} \quad (6)$$

Thus the state vector also includes a rotation quaternion q. The rotation quaternion is a known computational method of representing the orientation. A suitable description can be found in "*Attitude determination using vector observations*", Markley, F. Landis, Flight Mechanics (Estimation Theory Symposium, 1992; p 537-551).

The controller 81 further stores a process model, which represents an approximation of the laws governing the motion forming the transition of the states over time based upon the inputs causing such transition in the first estimation mode 56. In the process model the motion of the implement is constrained to only the first plane. The process model is the following first order vector differential equation, expressed in state space:

$$\dot{X}=f(x,u) \quad (7)$$

The sensor output matrix u is defined in equation (1). The nonlinear vector function f is:

$$f(x)=[f_1(x) f_2(x) f_3(x) f_4(x) f_5(x)]^T \in R^{16} \quad (8)$$

The first term is the derivative of the position and, as a result, is the velocity in the reference frame. However, as motion is only in the first plane there is no velocity along the $y_{ref}$ axis. Therefore, the first term is constrained to:

$$f_1(x)=[v_x 0 v_z] \quad (9)$$

The second term is the derivative of the velocity and, as a result, is the acceleration in the reference frame. Again, as motion is only in the first plane there is no acceleration along the $y_{ref}$ axis. Therefore, the second term is constrained to:

$$f_2(x)=[a_x 0 a_z] \quad (10)$$

The third term is the derivative of the acceleration in the reference frame. It is set as zero by assuming that acceleration is constant between the first and second positions. This is particularly the case where the first and second positions are successive samples, which typically occur with a short intervening time interval:

$$f_3(x)=0 \quad (11)$$

The fourth term is the derivative of the angular velocity in the reference frame. It is set as zero by assuming that angular acceleration is constant between the first and second positions. This is particularly the case where the first and second positions are successive samples, which typically occur with short intervening time interval:

$$f_4(x)=0 \quad (12)$$

The fifth term is the derivative of the quaternion, in which $\omega_b$ is the angular velocity in the body frame:

$$f_5(x)=\frac{1}{2}Q(q)\omega_b \quad (13)$$

The controller 81 further stores process model Jacobian matrix F, which is the first coefficient in a Taylor series expansion of the vector function of the state vector. It is the mechanism used to linearise the EKF local about the current state estimate:

$$F = \frac{\partial f}{\partial x} = \begin{bmatrix} \frac{\partial f_1(x)}{\partial P_{ref}^T} & \frac{\partial f_1(x)}{\partial V_{ref}^T} & \frac{\partial f_1(x)}{\partial A_{ref}^T} & \frac{\partial f_1(x)}{\partial \omega_{ref}^T} & \frac{\partial f_1(x)}{\partial q^T} \\ \frac{\partial f_2(x)}{\partial P_{ref}^T} & & L & & \\ & M & & & \\ \frac{\partial f_5(x)}{\partial P_{ref}^T} & & & & \frac{\partial f_{5L}(x)}{\partial q^T} \end{bmatrix} \in R^{16 \times 16} \quad (14)$$

The following known terms are used for convenience:

$$0_{3\times 3} = \begin{bmatrix} 0 & 0 & 0 \\ 0 & 0 & 0 \\ 0 & 0 & 0 \end{bmatrix}, 0_{3\times 1} = \begin{bmatrix} 0 \\ 0 \\ 0 \end{bmatrix}, I_{3\times 3} = \begin{bmatrix} 1 & 0 & 0 \\ 0 & 1 & 0 \\ 0 & 0 & 1 \end{bmatrix}, \quad (15)$$

$$I_{3\times 3}^\% = \begin{bmatrix} 1 & 0 & 0 \\ 0 & 0 & 0 \\ 0 & 0 & 1 \end{bmatrix}$$

Each term in the process model Jacobian matrix F is as follows:

$$\begin{bmatrix} \frac{\partial f_1(x)}{\partial P_{ref}^T} & \frac{\partial f_1(x)}{\partial V_{ref}^T} & \frac{\partial f_1(x)}{\partial A_{ref}^T} & \frac{\partial f_1(x)}{\partial \omega_{ref}^T} & \frac{\partial f_1(x)}{\partial q^T} \end{bmatrix} = \quad (16)$$
$$[0_{3\times 3} \; I_{3\times 3}^\% \; 0_{3\times 3} \; 0_{3\times 3} \; 0_{3\times 4}]$$

$$\begin{bmatrix} \frac{\partial f_2(x)}{\partial P_{ref}^T} & \frac{\partial f_2(x)}{\partial V_{ref}^T} & \frac{\partial f_2(x)}{\partial A_{ref}^T} & \frac{\partial f_2(x)}{\partial \omega_{ref}^T} & \frac{\partial f_2(x)}{\partial q^T} \end{bmatrix} = \quad (17)$$
$$[0_{3\times 3} \; 0_{3\times 3} \; I_{3\times 3}^\% \; 0_{3\times 3} \; 0_{3\times 4}]$$

$$\begin{bmatrix} \frac{\partial f_3(x)}{\partial P_{ref}^T} & \frac{\partial f_3(x)}{\partial V_{ref}^T} & \frac{\partial f_3(x)}{\partial A_{ref}^T} & \frac{\partial f_3(x)}{\partial \omega_{ref}^T} & \frac{\partial f_3(x)}{\partial q^T} \end{bmatrix} = \quad (18)$$
$$[0_{3\times 3} \; 0_{3\times 3} \; 0_{3\times 3} \; 0_{3\times 3} \; 0_{3\times 4}]$$

$$\begin{bmatrix} \frac{\partial f_4(x)}{\partial P_{ref}^T} & \frac{\partial f_4(x)}{\partial V_{ref}^T} & \frac{\partial f_4(x)}{\partial A_{ref}^T} & \frac{\partial f_4(x)}{\partial \omega_{ref}^T} & \frac{\partial f_4(x)}{\partial q^T} \end{bmatrix} = \quad (19)$$
$$[0_{3\times 3} \; 0_{3\times 3} \; 0_{3\times 3} \; 0_{3\times 3} \; 0_{3\times 4}]$$

$$\begin{bmatrix} \frac{\partial f_5(x)}{\partial P_{ref}^T} & \frac{\partial f_5(x)}{\partial V_{ref}^T} & \frac{\partial f_5(x)}{\partial A_{ref}^T} & \frac{\partial f_5(x)}{\partial \omega_{ref}^T} & \frac{\partial f_5(x)}{\partial q^T} \end{bmatrix} = \quad (20)$$
$$\begin{bmatrix} 0_{3\times 3} & 0_{3\times 3} & 0_{3\times 3} & \frac{\partial \frac{1}{2}Q(q)\omega_b}{\partial \omega_{ref}^T} & \frac{\partial \frac{1}{2}Q(q)\omega_b}{\partial q^T} \end{bmatrix}$$

The process model Jacobean matrix F may be discretized to obtain a discrete time transition matrix $\Phi$, which is the standard form of solution to a set of first order differential equations as follows, in which I is an identity matrix and t is time:

$$\Phi = \exp(F \cdot dt) \approx I + F \cdot dt \quad (21)$$

The controller 81 further stores a measurements vector, representing the output from the IMU 30, in the reference frame as follows:

$$z = [A_{ref}^T \omega_{ref}^T]^T \in R^6 \quad (22)$$

The acceleration in the reference frame $A_{ref}$ is calculated in a similar manner to equation (5) as follows:

$$A_{ref} = D_{ref}^b A_b - \begin{bmatrix} a_{gravity}^x \\ a_{gravity}^y \\ a_{gravity}^z \end{bmatrix} \quad (23)$$

The components of gravitational acceleration in the initial body frame $[a_{gravity}^x, a_{gravity}^y, a_{gravity}^z]^T$ are as determined in equation (4) in the first position. $A_b$ is the output from the accelerometer and is therefore in the new body frame. $D_{ref}^b$ is a rotation matrix representing the rotation between the body frame at the second position and the reference frame. This rotation matrix may be calculated by the controller 81 based upon the angular velocity data and the correlation between this data and the associated acceleration data received from the IMU 30 as the implement 11 moves from the first to second positions. Hence, the estimated acceleration can be translated into the reference frame. The angular velocity vector $\omega_{ref}$ in the reference frame is rotated from the angular velocity output $\omega_b$ from the gyroscope, which is in the body frame, as follows:

$$\omega_{ref} = D_{ref}^b \cdot \omega_b \quad (24)$$

The controller 81 further stores a measurements model as follows, in which H is the measurements model Jacobian matrix:

$$z = H \cdot x \quad (25)$$

$$H = \frac{\partial h}{\partial x} = \begin{bmatrix} 0_{3\times3} & 0_{3\times3} & I_{3\times3} & 0_{3\times3} & 0_{3\times4} \\ 0_{3\times3} & 0_{3\times3} & 0_{3\times3} & I_{3\times3} & 0_{3\times4} \end{bmatrix} \in R^{6\times16} \quad (26)$$

The controller 81 further stores an error covariance matrix P, which may represent the estimation error in the state vector x, a process model covariance matrix Q, which may represent the errors in the process model, treated as noise in the process model $\dot{x}$, and an observation covariance matrix R, which may represent the noise in the sensor data.

In order to implement the EKF the controller 81 begins an initialization step. During the initialization step the controller 81 determines or retrieves from its memory initial values (i.e. at time k=0) the state vector $\hat{x}_0$, the error covariance matrix $\hat{P}_0$, the process covariance matrix $\hat{Q}_0$ and the observation covariance matrix $\hat{R}_0$. For example, $\hat{x}_0$ is set to zeros and preset values of $\hat{P}_0$, $\hat{Q}_0$ and $\hat{R}_0$ are retrieved from the controller 81 memory. The preset values can be determined by experimentation with the machine 10 and are set to increase the speed and accuracy of convergence of the EKF.

The controller 81 subsequently performs a prediction step to determine a state vector estimate $\hat{x}$ and covariance estimate $\hat{P}$ at time k by implementing the following prediction equations using equations (7) and (21):

$$\hat{x}_{k|k-1} = f(\hat{x}_{k-1|k-1}) \quad (27)$$

$$\hat{P}_{k|k-1} = \Phi_k \hat{P}_{k-1|k-1} \Phi_k^T + Q \quad (28)$$

The controller 81 subsequently performs an update step to update the state vector estimate $\hat{x}$ and covariance estimate $\hat{P}$ at time k using the sensor data output 58 (i.e. the measurements). The state vector estimate $\hat{x}$ and covariance estimate $\hat{P}$ at time k are thus updated by implementing the following update equations:

$$\hat{x}_{k|k} = \hat{x}_{k|k-1} + K_k y_k \% \quad (29)$$

$$\hat{P}_{k|k-1} = (I - K_k H_k) \hat{P}_{k|k-1} \quad (30)$$

In which, for the sake of convenience:

$$y_k \% = z_k - H \cdot x \quad (31)$$

$$S_k = H_k \hat{P}_{k|k-1} H_k^T + R \quad (32)$$

$$K_k = \hat{P}_{k|k-1}^T H_k^T S_k^{-1} \quad (33)$$

The controller 81 may implement the prediction and update steps a plurality of times in order to improve the estimates of the state vector. Once the prediction and update steps are complete, the estimated second position of the implement 11 in the reference frame is represented by the first term of $\hat{x}_{k|k}$.

Second Estimation Mode

In the second estimation mode 57, the trajectory and second position of the implement 11 may be estimated based upon the motion radius l, which is assumed to be constant during the movement between the first and second positions, and sensor data. The motion radius l is preferably estimated in the calibration mode. In a further step the second position is estimated based upon the estimated motion radius l, a second estimation model and the sensor data.

In the calibration mode the controller 81 may receive an indication of the motion radius l, which can be determined by physical measurement and provided to the machine control system by an operator via an input. However, the motion radius l may be estimated by operating the implement 11 to move a short distance in the second motion from a first calibration position to a second calibration position. The motion radius l is estimated based upon the sensor data derived from the calibration motion. For example, the first and second calibration positions and trajectory are estimated based upon the acceleration and angular velocity data received from the IMU 30. The distance between the first and second calibration positions is then determined. The angle of rotation about the pivot axis between the first and second calibration positions is determined using the angular velocity data. The motion radius l can then be determined based upon the distance and angle of rotation.

In the second estimation mode 57 the controller 81 more accurately determines the motion of the implement 11 based upon the constraint the second estimation model to motion only in the second plane, and preferably only the circular motion 40 in the second plane. For example, in the second estimation model the controller 81 may derive the orientation of the IMU 30 at the second position by integrating the angular velocity rates received from the IMU 30. The acceleration data received between the first and second positions is integrated twice to provide position data, which is corrected using the orientation calculated from the angular velocity data. Therefore, the second position relative to the first position and trajectory is determined with the knowledge that the motion radius l is constant.

In particular, the second motion may be modelled by constraining the position vector of the IMU 30 in the body frame by defining the body frame as having its x axis aligned parallel to the motion radius l. Therefore, the position vector of the IMU 30 in the body frame is:

$$P_{body} = [l\ 0\ 0] \quad (34)$$

The position of the implement 11 in the reference frame may be described as:

$$P_{inertial} = D_I^B P_{Body} \quad (35)$$

$D_I^B$ is a rotation matrix defining the rotation between the reference and body frames. The reference frame may be set as the body frame at the first position. As a result, the second position in the reference frame can be estimated by determining $D_I^B$, which is achieved through the estimation process. It may be calculated by the controller 81 based upon the angular velocity data and the correlation between this data and the associated acceleration data received from the IMU 30 as the implement 11 moves from the first to second positions.

The inertial velocity vector of the bucket in the body frame can be determined as follows:

$$V_{body}^{inertial\_velocity} = V_{body}^{relative\_velocity} + \omega_{body} \times P_{body} \quad (36)$$

$V_{body}^{relative\_velocity}$ is the apparent velocity of the IMU 30 in the body frame, which is zero due to the motion radius l being constant in the second motion. $\omega_{body}$ is the angular velocity vector of the bucket in the body frame, which can be determined from the angular velocity data.

In the second estimation mode 57 the second estimation model comprises an EKF for estimating both the motion radius l and second position. In particular, the controller 81 may initially estimate the motion radius l using the EKF and then subsequently use the estimated motion radius l as a fixed value in a further EKF in order to determine the second position of the implement 11. The following is a description of a particularly suitable EKF for the second estimation mode 56.

Second Estimation Mode: Exemplary Estimation Model

The controller 81 stores a state vector in the reference frame comprising the motion radius l, the position $P_{inertial}$, velocity $V_{inertial}$ and rotation quaternion q as follows:

$$x = [P_{inertial}^T V_{inertial}^T q_T^T l]^T \quad (37)$$

The controller 81 further stores a process model as the following first order differential equation and nonlinear vector function f:

$$\dot{x} = f(x, u) \quad (38)$$

$$f(x,u) = [f_1(x,u) f_2(x,u) f_3(x,u) f_4(x,u)]^T \quad (39)$$

The first term is the derivative of the position in the reference frame and thus is the velocity in the reference frame:

$$f_1(x,u) = V_{inertial}^T \quad (40)$$

The second term is the derivative of the velocity in the reference frame $V_{inertial}$ and therefore is the acceleration of the implement 11 in the reference frame. The acceleration may be derived from the accelerometer measurement A in the body frame and rotating it into the reference frame using the rotation matrix $D_I^B$. Furthermore, the accelerometer measurement A includes the gravitational acceleration g, which must be compensated for. Thus the second term is set as follows:

$$f_2(x, u) = D_I^B A + \begin{bmatrix} 0 \\ 0 \\ g \end{bmatrix} \quad (41)$$

The third term is the derivative of the quaternion:

$$f_3(x,u) = \tfrac{1}{2} Q(q) \omega \quad (42)$$

The fourth term is the derivative of the motion radius l. Due to the implement 11 moving only in a circular motion 40, the motion radius l does not change and thus the derivative is zero:

$$f_4(x,u) = 0 \quad (43)$$

The controller 81 further stores process model Jacobian matrix F as follows:

$$F = \frac{\partial f}{\partial x} = \begin{bmatrix} \frac{\partial f_1(x)}{\partial P_{inertial}^T} & \frac{\partial f_1(x)}{\partial V_{inertial}^T} & \frac{\partial f_1(x)}{\partial q^T} & \frac{\partial f_1(x)}{\partial l} \\ \frac{\partial f_2(x)}{\partial P_{inertial}^T} & & L & \\ & & M & \\ \frac{\partial f_4(x)}{\partial P_{inertial}^T} & & & \frac{\partial f_4(x)}{\partial l} \end{bmatrix} \in R^{10 \times 10} \quad (44)$$

Each term in the process model Jacobian matrix F is as follows:

$$\begin{bmatrix} \frac{\partial f_1(x)}{\partial P_{inertial}^T} & \frac{\partial f_1(x)}{\partial V_{inertial}^T} & \frac{\partial f_1(x)}{\partial q^T} & \frac{\partial f_1(x)}{\partial l} \end{bmatrix} = [0_{3\times3} \; I_{3\times3}^\% \; 0_{3\times3} \; 0_{3\times1}] \quad (45)$$

$$\begin{bmatrix} \frac{\partial f_2(x)}{\partial P_{inertial}^T} & \frac{\partial f_2(x)}{\partial V_{inertial}^T} & \frac{\partial f_2(x)}{\partial q^T} & \frac{\partial f_2(x)}{\partial l} \end{bmatrix} = \quad (46)$$

$$\begin{bmatrix} 0_{3\times3} & 0_{3\times3} & \frac{\partial \left( D_I^B A + \begin{bmatrix} 0 \\ 0 \\ g \end{bmatrix} \right)}{\partial q^T} & 0_{3\times1} \end{bmatrix}$$

$$\begin{bmatrix} \frac{\partial f_3(x)}{\partial P_{inertial}^T} & \frac{\partial f_3(x)}{\partial V_{inertial}^T} & \frac{\partial f_3(x)}{\partial q^T} & \frac{\partial f_3(x)}{\partial l} \end{bmatrix} = \quad (47)$$

$$\begin{bmatrix} 0_{3\times3} & 0_{3\times3} & \frac{\partial \left( \tfrac{1}{2} Q(q) \omega \right)}{\partial q^T} & 0_{3\times1} \end{bmatrix}$$

$$\begin{bmatrix} \frac{\partial f_4(x)}{\partial P_{inertial}^T} & \frac{\partial f_4(x)}{\partial V_{inertial}^T} & \frac{\partial f_4(x)}{\partial q^T} & \frac{\partial f_4(x)}{\partial l} \end{bmatrix} = [0_{1\times3} \; 0_{1\times3} \; 0_{1\times3} \; 0_{1\times1}] \quad (48)$$

The controller 81 further stores a measurements vector z comprising pseudo-measurements. Pseudo-measurements are discussed in further detail in "*Pseudo-Measurements as Aiding to INS during GPS Outages*", Itzik Klein, Sagi Filin, Tomer Toledo, Navigation, Vol. 57, Issue 1, Pages 25-34. The measurements vector z is set as:

$$z = [z_p^T z_v^T]^T \quad (49)$$

$z_p$ and $z_v$ are determined based upon equations (35) and (36):

$$z_p = P_{Inertial} - D_I^B P_{Body} \quad (50)$$

$$z_v = V_{body}^{inertial\_velocity} - \omega_{body} \times P_{body} \quad (51)$$

$z_p$ is an equality constraint on position. In equation (35) the position in the reference frame is transformed to the position in the body frame only by pure rotation. Therefore, in an ideal model $z_p = 0$, but this will not be the case in an estimation. Therefore, the value of $z_p$, which will not be zero in the estimation of the second position, can be described as a "pseudo-measurement".

In equation (36) $V_{body}^{inertial\_velocity}$ only has a component perpendicular to the motion radius l, as the velocity component along the motion radius l is zero due to the constant motion radius l. $V_{body}^{inertial\_velocity}$ is equal to the cross product of the angular velocity and the position in the body frame. Therefore, in an ideal model, $z_v = 0$, but this will not be the case in an estimation. Therefore, the value of $z_v$, which will not be zero in the estimation of the second position, can be described as a "pseudo-measurement".

The controller 81 further stores a measurements model as follows, in which H is the measurements model Jacobian matrix:

$$z = [z_p^T \ z_v^T]^T = h(x) \quad (52)$$

$$H = \quad (53)$$

$$\frac{\partial h}{\partial x} = \begin{bmatrix} \frac{\partial z_p}{\partial P_{inertial}} & \frac{\partial z_p}{\partial V_{inertial}} & \frac{\partial z_p}{\partial q} & \frac{\partial z_p}{\partial l} \\ \frac{\partial z_v}{\partial P_{inertial}} & \frac{\partial z_v}{\partial V_{inertial}} & \frac{\partial z_v}{\partial q} & \frac{\partial z_v}{\partial l} \end{bmatrix} \begin{bmatrix} I_3 & 0_3 & \frac{\partial(-D_I^B)}{\partial q} & 0 \\ 0_3 & I_3 & 0_{3\times 4} & 0 \end{bmatrix}$$

The EKF is subsequently implemented as discussed in respect of the first estimation mode 56 and equations 27 to 33.

INDUSTRIAL APPLICABILITY

The machine 10 may be operable in an implement operation mode in which it is controlled, for example by an operator or automatically, to perform a first implement operation at the first position and second implement operation at the second position. The first and second implement operations may be work, such as digging, and the constrained operating mode may be implemented to provide feedback to the operator and/or controller 81 to confirm the location of the implement 11.

Figure 4:
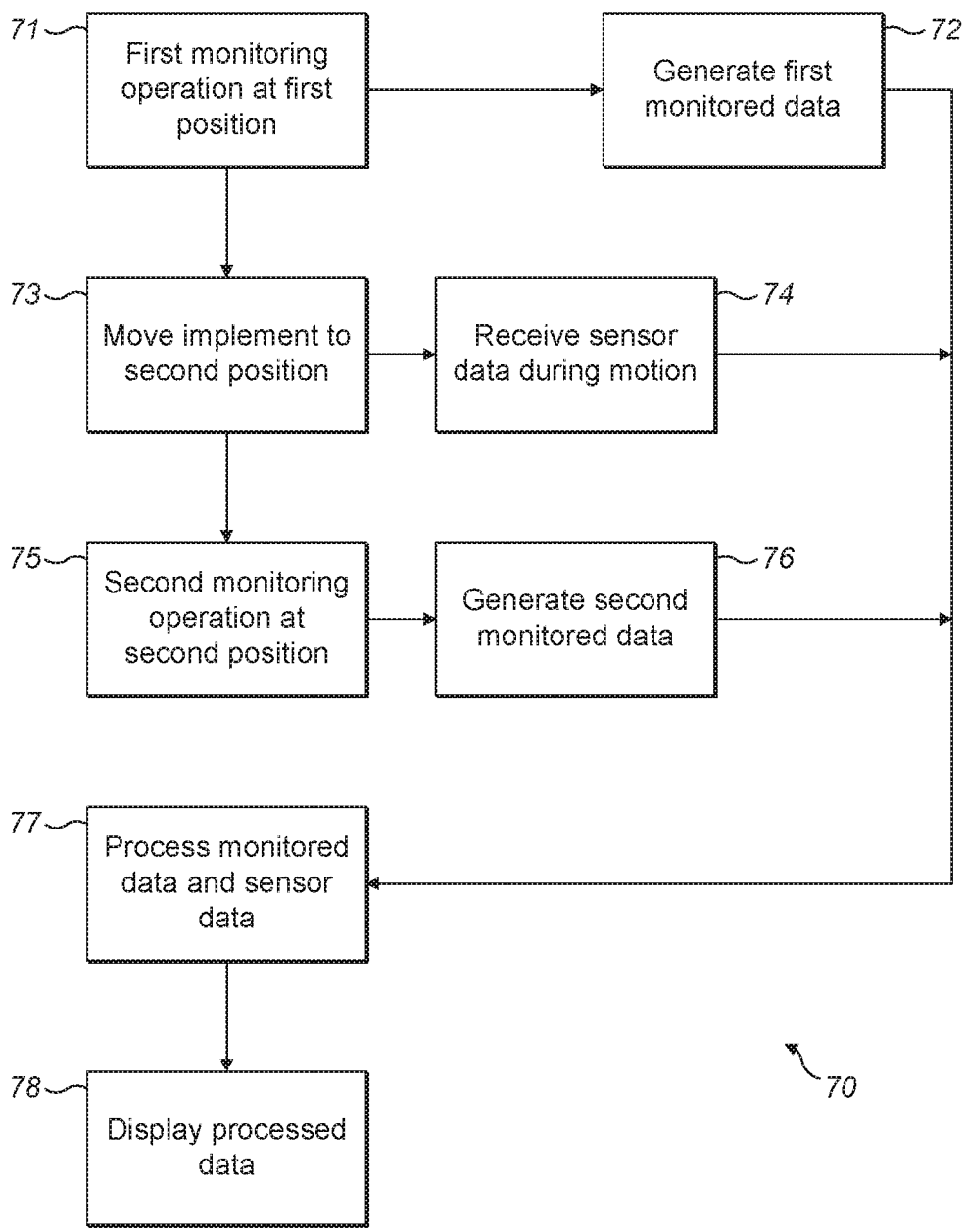
FIG. 4 illustrates a flowchart of a monitoring mode of operation of the machine according to the present disclosure.

The implement operation mode may be the monitoring mode as shown in FIG. 4, during which the constrained operating mode may be implemented to estimate the trajectory and position of the implement 11 during the monitoring mode. As shown in FIG. 4, in the monitoring mode 70 the monitoring system may perform a first monitoring operation 71 at the first position to generate first monitored data 72, such as radar data mapping the ground below the implement 11 in the first position. Subsequently, the controller 81 and/or operator may move 73 the implement 11 along a trajectory to a second position in only the first or second motion, during which the IMU 30 generates sensor data and the sensor data is received 74 at the controller 81. At the second position the monitoring system may perform a second monitoring operation 75 to generate second monitored data 76, such as radar data mapping the ground below the implement 11 in the second position. Such monitoring operations may be performed a plurality of times as the implement 11 moves along its trajectory.

Subsequently the controller 81 may process 77 the first and second monitored data and sensor data, including determining the trajectory and second position as described in respect of the constrained operating mode. As a result, the trajectory and second position relative to the first position (or any predetermined reference frame) is estimated. Subsequently the controller 81 associates the first and second monitored data 72, 76 based upon the estimation of the trajectory and/or second position to generate processed data. The resulting processed data may be displayed 78 to an operator. For example, the controller 81 may generate a radar based map of the ground below the first and second positions. The resulting map may be displayed to an operator.

Estimating the second position using only the sensor data from the IMU 30 may be unfeasible if the motion of the implement 11 is unconstrained because gravitational acceleration swamps the sensor data. In particular, in the monitoring mode 70 the kinematic acceleration of the implement 11 is relatively small and is thus harder to separate from the gravitational acceleration. A typical prior art approach would be to combine the sensor data from the IMU 30 with data from another sensor, such as GPS or the like. Alternatively, the geometry of the arm arrangement 16 can be measured with angle encoders or the like. However, in the machine 10 the addition of another sensor may be impractical, for example by being too complex or expensive. Furthermore, the addition of another sensor to the machine 10 other than on the implement 11 means that the implement 11 can be used to estimate the trajectory and second position if the machine 10 has the correct sensors installed.

However, by constraining the movement of the implement 11 to only the first and second motion the trajectory and second position can be more accurately estimated based upon the sensor data from only the IMU 30. As a result, no additional sensors are required to estimate the second position, thereby reducing costs and complexity. Furthermore, the implement 11 can be swapped between machines 10, regardless of the additional sensors they comprise, and still estimate the positions of the implement 11. This is of particular benefit if the implement 11 comprises the monitoring system since an implement 11 with the monitoring system and IMU 30 can be applied to various different machines 10.

What is claimed is:

1. A method of operating a machine comprising an implement configured for motion in at least three degrees of freedom, the method comprising:
   receiving an input;
   in response to the input, constraining the motion of the implement in a first motion in a first plane or in a second motion in a second plane from a first position to a second position;
   receiving sensor data from an IMU attached to the implement and indicative of the movement of the implement in said first plane or in said second plane;
   determining whether the movement is the first or second motion;
   selecting a first or second estimation mode based upon the determination that the movement is the first or second motion respectively;
   using the constrained motion to define at least one pseudo-measurement having a value of zero;
   using said at least one pseudo-measurement in said first or second estimation mode; and implementing the first or second estimation mode to estimate the trajectory of the implement and the second position based upon the sensor data.

2. The method as claimed in claim 1 wherein sequential samples of sensor data are received from the IMU at the first and second positions, wherein the implement is static wherein the implement is moving, and also comprising using the static samples to effect calibration and using the moving samples to effect estimation.

3. The method as claimed in claim 1 further comprising determining that motion is occurring based upon a value derived from the sensor data reaching or exceeding a threshold value.

4. The method as claimed in claim 1 further comprising; performing a first monitoring operation at the first position to generate first monitored data; performing a second monitoring operation at the second position to generate second monitored data; estimating said second position; and associating the first and second monitored data with the estimation of the second position.

5. The method as claimed in claim 1 wherein the sensor data comprises acceleration data indicative of the acceleration of the implement and angular velocity data indicative of the angular velocity of the implement.

6. The method as claimed in claim 1 further comprising maintaining the implement static at the first position and, the first and/or second estimation mode, in the presence of gravity disturbance in the sensor data, determining a gravity vector based upon acceleration data received from the IMU whilst the implement is static at the first position.

7. The method as claimed in claim 1 wherein the first estimation mode comprises determining the trajectory and second position based upon sensor data received from the IMU, and further comprising determining the trajectory and second position based upon a first estimation model and the sensor data.

8. The method as claimed in claim 1 wherein the first estimation mode comprises receiving acceleration data indicative of the movement and determining the second position by resolving the direction of acceleration during the movement based upon angular velocity data received from the IMU.

9. The method as claimed in claim 1 wherein the first estimation mode comprises implementing a Kalman filter.

10. The method as claimed in claim 1 wherein the second motion is a circular motion in the second plane about a pivot axis and along a constant motion radius from the pivot axis.

11. The method as claimed in claim 10 wherein the pivot axis is in the first plane.

12. The method as claimed in claim 10 wherein in the second estimation mode a motion radius is received and the second position is estimated based upon the received motion radius, a second estimation model and the sensor data received from the IMU.

13. The method as claimed in claim 12 wherein the motion radius is estimated during a calibration mode, wherein in the calibration mode the implement is moved in a calibration motion and the motion radius is estimated based upon the calibration motion.

14. The method as claimed in claim 12 wherein the motion radius is estimated based upon the second estimation model.

15. A machine comprising:
an implement attached to a main unit by an arm arrangement; and
a control system for controlling the arm arrangement to move the implement in at least three degrees of freedom, the control system comprising at least one input, an IMU attached to the implement, and at least one actuator for controlling the movement of the arm arrangement and implement;
wherein the control system further comprises a controller configured to:
receive an input from the at least one input;
determine whether the movement is the first or second motion;
select a first or second estimation mode based upon the determination that the movement is the first or second motion respectively;
use the constrained motion to define at least one pseudo-measurement having a value of zero;
use said at least one pseudo-measurement in said first or second estimation mode; and implement the first or second estimation mode to estimate the trajectory of the implement and the second position based upon the sensor data.

* * * * *